United States Patent [19]
Holzhammer et al.

[11] Patent Number: 6,092,209
[45] Date of Patent: Jul. 18, 2000

[54] METHOD AND APPARATUS FOR MANAGING POWER CONSUMPTION OF PERIPHERAL DEVICES OF PERSONAL COMPUTERS

[75] Inventors: Gerald S. Holzhammer, Aloha; Thomas J. Hernandez, Beaverton; Richard P. Mangold, Hillsboro, all of Oreg.

[73] Assignee: Intel Corporation, Santa Clara, Calif.

[21] Appl. No.: 09/008,755

[22] Filed: Jan. 19, 1998

Related U.S. Application Data

[63] Continuation of application No. 08/653,066, May 31, 1996, abandoned, which is a continuation of application No. 08/318,052, Oct. 4, 1994, abandoned.

[51] Int. Cl.[7] ....................................................... G06F 1/32
[52] U.S. Cl. ............................................................. 713/324
[58] Field of Search ...................................... 713/300–340

[56] References Cited

U.S. PATENT DOCUMENTS

| | | | |
|---|---|---|---|
| 5,471,625 | 11/1995 | Mussemann et al. | 713/322 |
| 5,511,203 | 4/1996 | Wisor et al. | 713/322 |
| 5,560,022 | 9/1996 | Dunstan et al. | 713/300 |
| 5,594,426 | 1/1997 | Ushijima et al. | 340/825.02 |
| 5,640,573 | 6/1997 | Gephardt et al. | 713/340 |
| 5,752,050 | 5/1998 | Hernandez et al. | 713/330 |
| 5,754,869 | 5/1998 | Holzhammer et al. | 713/300 |

*Primary Examiner*—Ayaz R. Sheikh
*Assistant Examiner*—David A. Wiley
*Attorney, Agent, or Firm*—Blakely, Sokoloff, Taylor & Zafman LLP

[57] ABSTRACT

A system for managing power consumption in a personal computer, specifically peripheral devices including the display and other external devices such as disk drives, CD-ROM drives, modems and the like. A software and hardware architecture is provided for managing the power consumption of peripheral devices through their device drivers and a global event messaging scheme. A set of power events is defined which are delivered to device drivers, through an associated power management handler. Each driver can make the decision as to whether that power event should affect its coupled device's power state.

21 Claims, 7 Drawing Sheets

METHOD AND APPARATUS FOR MANAGING POWER CONSUMPTION OF PERIPHERAL DEVICES OF PERSONAL COMPUTERS

This is a continuation application of Ser. No. 08/653,066 filed May 31, 1996 now abandoned, which is a continuation of Ser. No. 08/318,052 filed Oct. 4, 1994 (abandoned).

BRIEF SUMMARY OF THE INVENTION

The present invention is a system for managing power consumption in a personal computer, specifically peripheral devices including the display and other external devices such as disk drives, CD-ROM drives, modems and the like. Most prior art techniques for managing power consumption in personal computers have been for the purpose of extending battery life of portable computers whose usual source of power is a battery, by providing techniques for managing power consumption in desktop computers as well, whose usual source of power is a 120 volt, 60 Hz wall connection. In this manner, substantial savings in electric power consumption are possible due to the large number of computers which are left on for extended periods of time, even when not being actively used.

Power consumption management systems, whether present in a portable computer or desktop computer, traditionally rely upon hardware timers which, upon expiration, turn off or reduce power to various system components without informing the operating system which controls the computer. For example, such prior art systems, upon expiration of the hardware timer, generate a system management interrupt (SMI), which shuts down a specific subsystem. The subsystem could even be the processor itself which, once it is turned off, can only be awakened by another hardware generated signal. If the computer is connected to a network, such processor shutdown would result in a loss of the network connection. By utilizing hardware generated events as a power consumption management tool, the operating system is not made aware of such shutdowns. As a result, when the subsystem is awakened, the operating system, being unaware of the shutdown, interacts with the subsystem as if there were no shutdown which can result in inconsistent operation. Additionally, when devices are being turned on and off asynchronously, without coordination, if several devices attempt to power off or on simultaneously, there could be large voltages spikes or sags that adversely impact system reliability. These potential problems are mitigated in portable computer systems where the number of subsystems is limited and known by the system designer who can include necessary safeguards in the system firmware which has intimate knowledge of the hardware under its control. However, in a desktop system, where there may be numerous add-on subsystems such as network cards, CD-ROM controller cards, graphics cards and the like, it is extremely difficult or sometimes impossible to fully provide for power consumption management of all subsystems without providing suitable notification to the operating system which can then coordinate these activities.

The present invention addresses these problems by providing a software and hardware architecture for managing the power consumption of peripheral devices through their device drivers and a global event messaging scheme.

DETAILED DESCRIPTION OF THE INVENTION

The present invention utilizes the fact that in a computer system, each device driver has the best knowledge for how and when to power its associated device down or up. By defining a set of power events and delivering them to device drivers, each driver can make the decision as to whether that power event should affect its coupled device's power state.

Power events are generated under the following conditions:

| Power Event | Condition |
|---|---|
| User_Idle | No keyboard or mouse activity for a user configurable period of time |
| User_Active | Keyboard or mouse activity |
| Sleep | A predefined user input occurs, at a user configurable timer expiration and/or by a network generated command |
| Wakeup | A predefined user input, at a user configurable timer expiration and/or by a network generated command |
| OS_Idle | CPU cycling in an operating system idle loop |

Device power states and the conditions under which each is active are as follows:

| Power State | Active Condition |
|---|---|
| PM_Enabled | Device is in use and may be operating at a reduced power level in a manner which is transparent to the device user |
| Suspend | Device is not in use and power can be removed without causing adverse effect on other devices |
| Normal | Device is in use and operating at full power |
| Standby | Device is not in use and is operating at a reduced power level |
| Off | Power has been removed from device |

Figure 1:
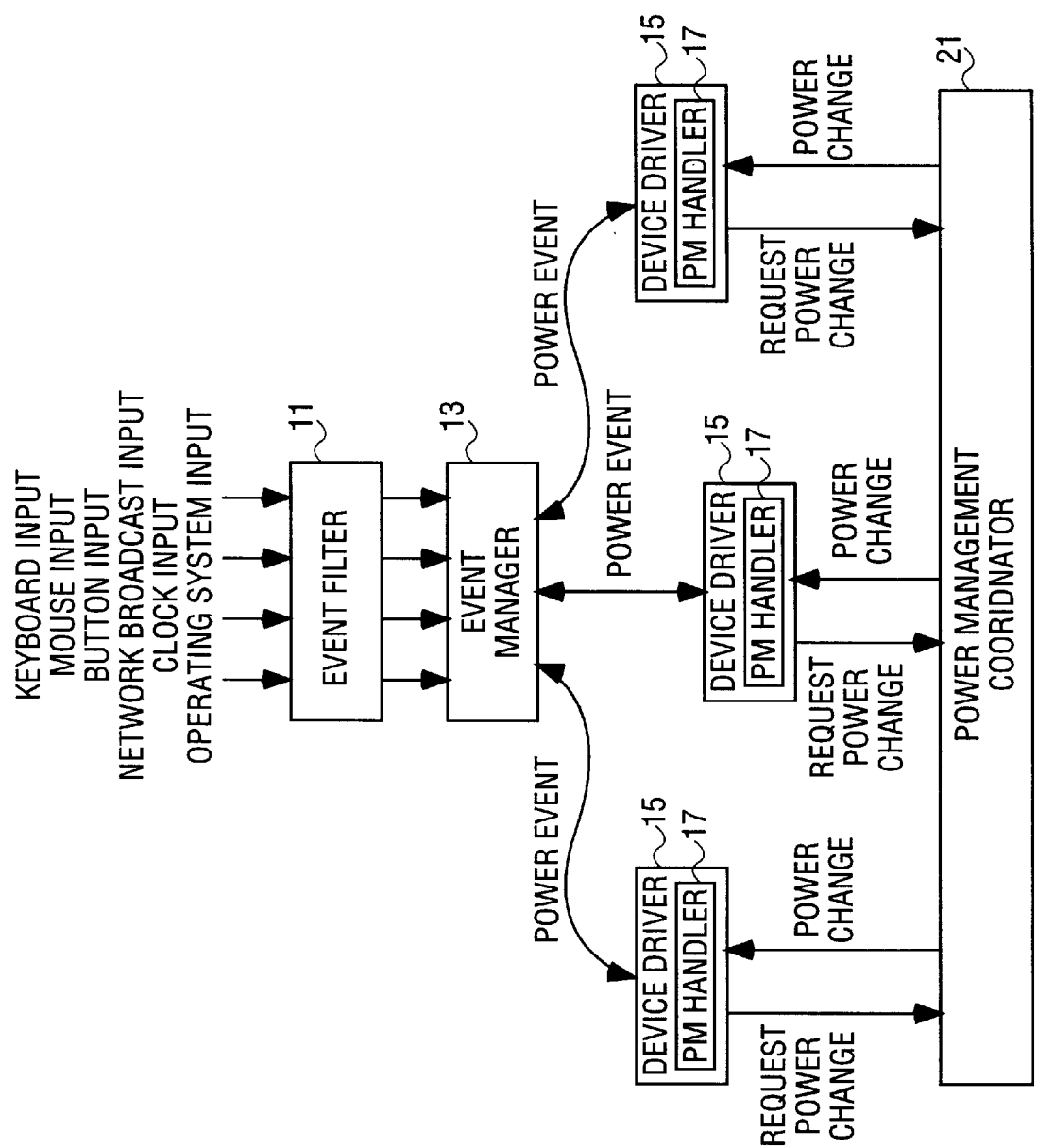
FIG. 1 is a block diagram showing the overall architecture of the invented system.

Once a driver has determined that a change should be made to its associated device's power state, the present invention operates to cause the power state change to take place or utilizes a coordinating piece of software that decides if it should allow the transition. For example, in the case where the device is on a bus that is powered down, and the device driver is issuing a request to be allowed to power up its associated device, the bus must first be powered-up through the device driver (in this case, a bus driver), before allowing the device to power up. A central power management coordinator (hereinafter PM Coordinator) could be used in connection with power sequencing to prevent large power spikes/sags when multiple devices need to power up/down based on the same event. FIG. 1 is an illustration of an architecture for personal computer power management according to the present invention including the optional PM Coordinator.

Figure 2A:
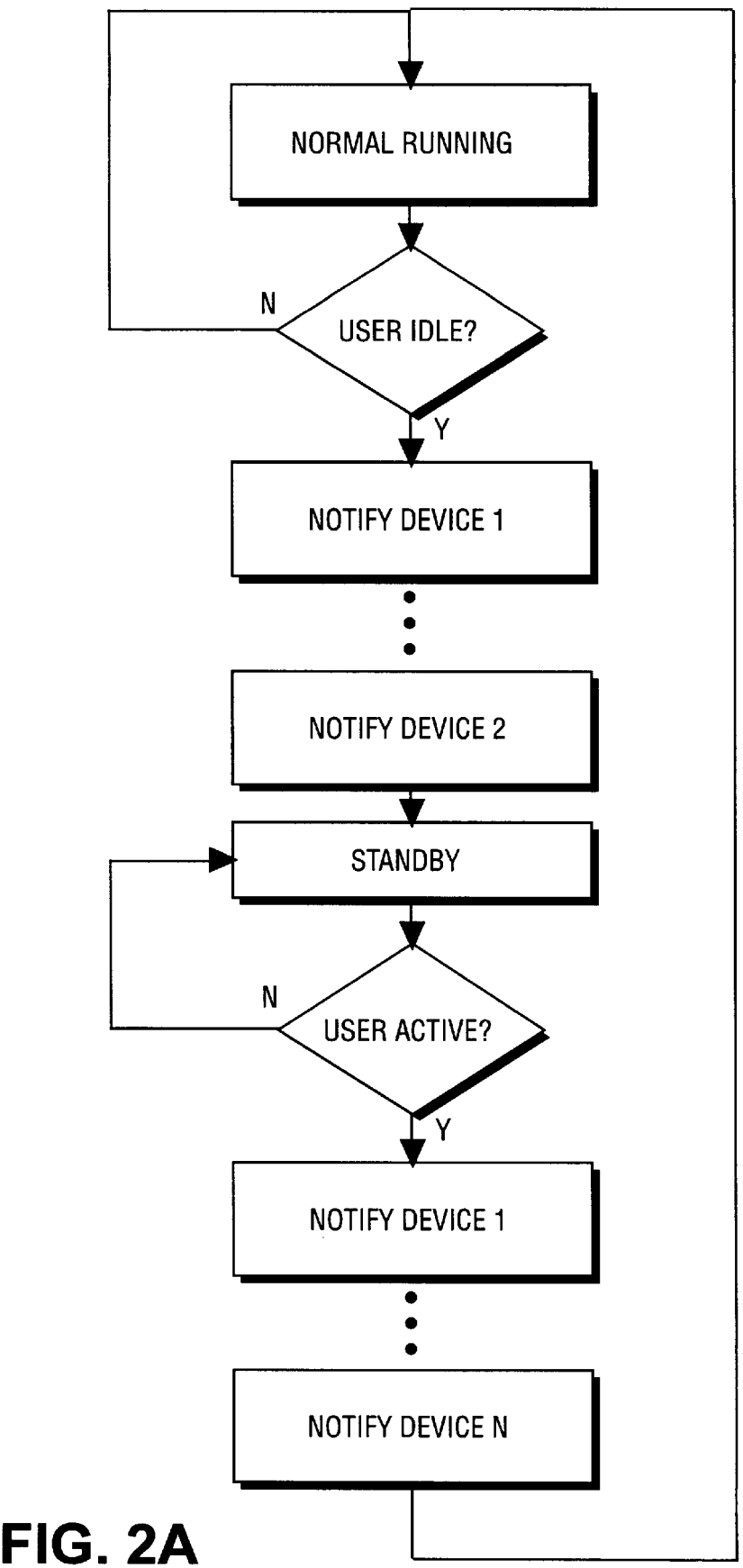
FIG. 2a is a flow diagram showing the flow of the processing performed by an event manager for User_Idle/User_Active power events.
Figure 2B:
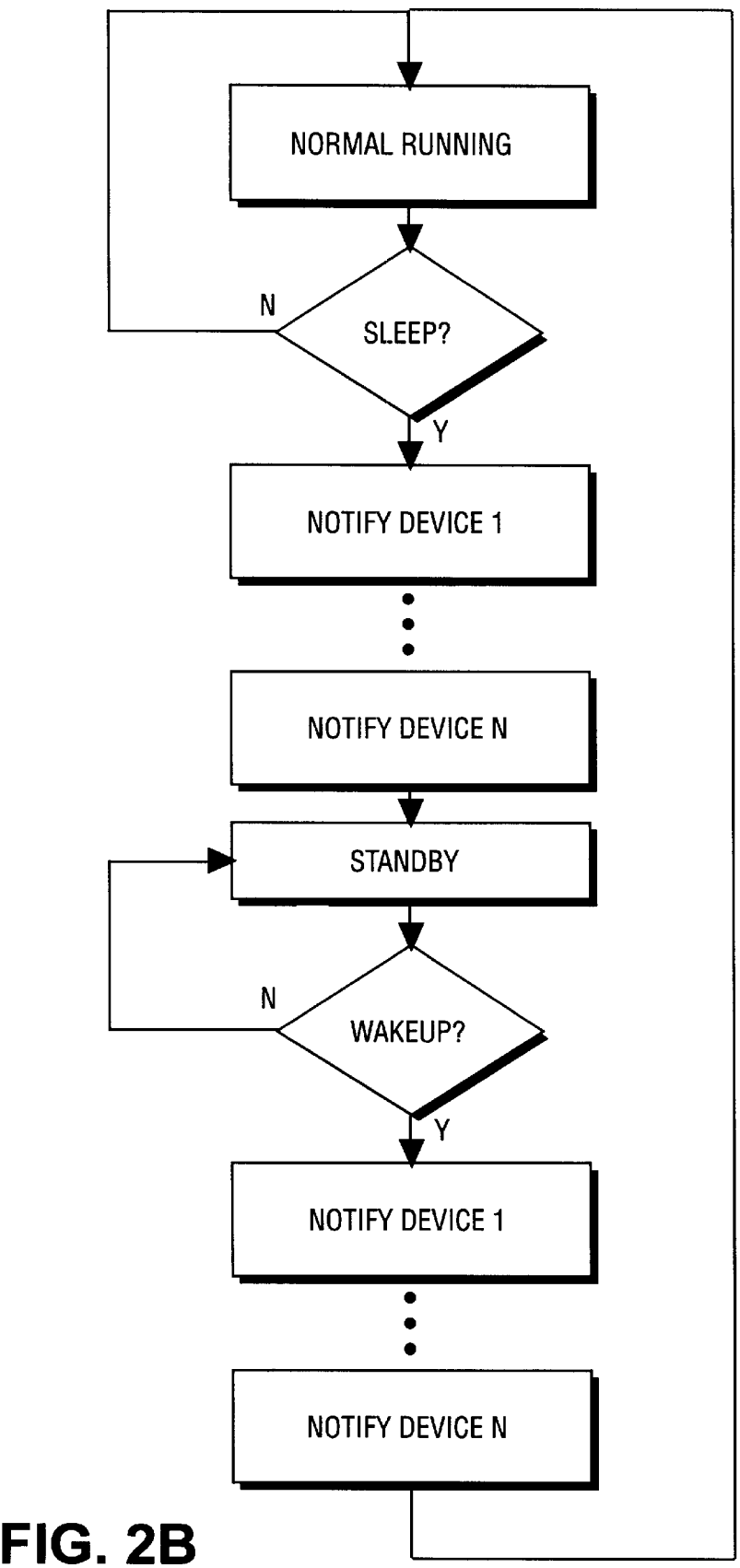
FIG. 2b is a flow diagram showing the flow of the processing performed by an event manager for Sleep/Wakeup power events.
Figure 2C:
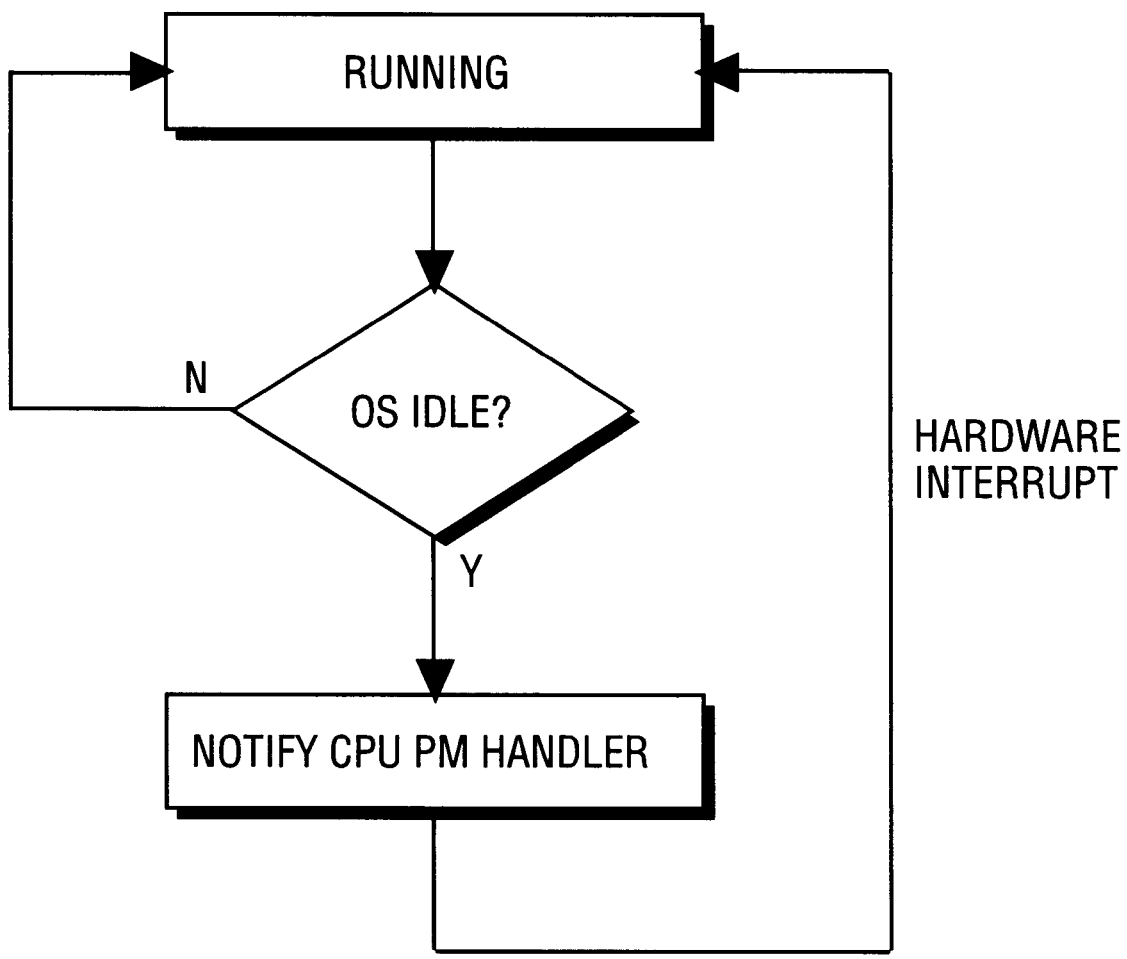
FIG. 2c is a flow diagram showing the flow of the processing performed by an event manager for the OS_Idle power event.

Power events can be generated by any software running on the system. In most cases they are generated by a device driver on the system board. As previously noted, examples of power events are: User_Idle, User_Active, Sleep, Wakeup, and OS_Idle. The first two are based on keyboard/mouse input. The next two might be created by a sleep button being pushed, a timer being preprogrammed to power down the machine at night, or perhaps by a network broadcast and the last by the operating system itself upon entering an idle loop. Power events are shown in FIG. 1 as being created as a result of more specific system events (e.g., keyboard input, mouse movement, button press, network broadcast, timer expiration) which are input to an event filter 11. Event filter 11 processes these inputs to generate a corresponding power event. The power events generated from event filter 11 are input to event manager 13 which passes the generated power events to device drivers 15. The details of suitable mechanisms for the software generation of the OS_Idle, User_Idle, User_Active, Sleep, and Wakeup power events should be readily apparent to persons skilled in the field of the invention. The event manager 13 is responsible for receiving and passing on power events to each device driver 15. The event manager 13 is a piece of software that is responsible for globally broadcasting certain power events to all device drivers. The event manager acts as a conduit for events, tracking and distributing events to proper destinations as needed. FIGS. 2a–2c are flowcharts which show the processing performed by an event manager 13 according to the present invention for User_Idle/User_Active power events (FIG. 2a), Sleep/Wakeup power events (FIG. 2b) and OS_Idle (FIG. 2c).

All device drivers 15 register a callback entry point with event manager 13 for receiving power events from the event manager. This entry point is a PM handler 17 within each device driver that processes the events.

Figure 3:
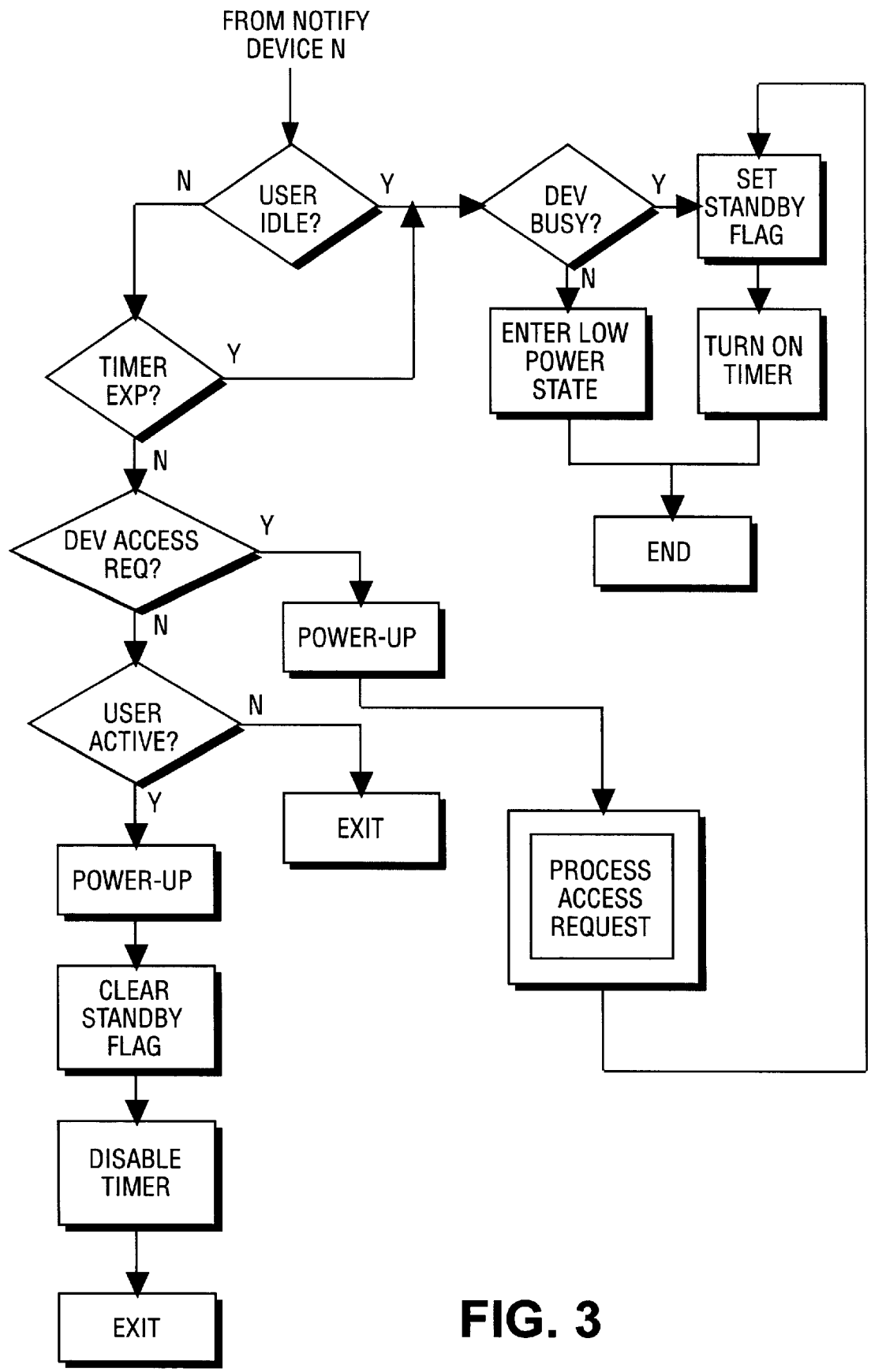
FIG. 3 is a flow diagram showing the flow of a User_Idle/User_Active PM handler within a device driver.

The processing performed by each PM handler 17 for User_Idle/User_Active power events is shown in FIG. 3. The processing performed by a PM handler for Sleep/Wakeup power events would be essentially the same except that for User_Idle and User_Active, an idle/sleep timer is set to a user configurable amount of time, while for the Sleep and Wakeup power events no timer is used. Instead, the Wakeup power event causes the device to wake up immediately, and the Sleep power event causes the device to be put into a lower power state when the device is no longer in use and there are no pending device access requests.

It is the responsibility of each PM handler 17 of each device driver 15 to determine if the power event received should affect its coupled device's power state. Most device drivers use power events such as Sleep and Wakeup to instigate power transitions. Other device drivers, such as video drivers, would also use the User_Idle and User_Active events to turn off user output. Once the device driver has determined that the event affects its coupled device's power state, and that it is safe to start the power transition (i.e. the device is not busy), in one embodiment, it initiates the transition, and in another embodiment, it requests permission to transition from PM Coordinator 21, the specifics of which are described in co-pending patent application Ser. No. 08/318,051 filed Oct. 4, 1994. Power management of the CPU and core logic is described in co-pending application Ser. No. 08/317,912 filed Oct. 4, 1994.

PM Coordinator 21 is implemented as software which decides if state transitions for devices which have been requested by their device drivers can be safely initiated, and that they occur in the correct sequence. If, for example, the only device on a bus issues a request to enter the suspend power state, the PM Coordinator might approve the transition, and then tell the bus driver that it can power its bus down. The converse is also true. If a device driver issues a request to power up, there might be another device (such as a bus) that should be powered up first. It is the PM Coordinator's responsibility to make sure that power transitions occur in the correct sequence, and also that devices do not power up simultaneously, causing voltage spikes/drops. The PM Coordinator is responsible for approving power transition requests from device drivers. The PM Coordinator bases its approval on recovery delays of each device. This delay is provided by the device driver as part of the power change request. The PM Coordinator uses this delay to prevent multiple devices from simultaneously transitioning. The device driver also relays information about the new power level to the PM Coordinator. If the new power state is Suspend, the PM Coordinator may decide to suspend parents of that device such as its expansion bus. Conversely, if a device driver requests a power change, and the parents of that device are suspended, then the PM Coordinator must turn them on first before the device driver can access its associated device. In order for the PM Coordinator to be able to turn off buses, there must be a database tree of power management dependencies which is built by the operating system. The operating system may build this tree by having device drivers of devices to be power managed register their power and child power relationships (i.e., specify all devices who should not have power applied to them until the parent device has had power supplied to it) with the PM coordinator as part of their initialization sequence.

Power Management of The Display and Other External Devices

A. Display Device Power Management

The requirement for the display monitor implemented as a cathode ray tube (CRT) to enter a low-power mode when not in use can be satisfied in software or hardware. The software solution further breaks down into a device driver-centric approach and a screen saver utility approach. Both software approaches are specific to a particular display monitor implementation and signal the display by reprogramming the CRT controller to eliminate SYNC signals which is interpreted by the display to enter the low-power mode. For the device driver-centric approach, the necessary modifications to the device driver of the display to cause the reprogramming of the CRT controller should be readily apparent to persons skilled in the field of the invention. Similarly, for the screen saver utility approach, the necessary modifications to a screen saver utility to cause the reprogramming of the CRT controller should be readily apparent to persons skilled in the field of the invention.

A hardware-centric approach is implemented by monitoring the frame buffer traffic from the CPU. After a programmable timeout period has passed, the display controller, i.e., the controller hardware itself, eliminates SYNC, which it would otherwise generate, achieving the same effect as the software solutions. The advantage of the hardware solution is operating system and driver independence. The details of a mechanism for monitoring the frame buffer traffic from the CPU and for enabling the display controller to eliminate SYNC should be readily apparent to persons skilled in the field of the invention.

B. Device Driver Modifications For Power Management

In addition to providing power management of the CPU, on-board system devices and the display, to achieve maximum power savings, it is also desirable to manage the power of external devices which interface to the system via expansion boards. Such devices include modems, disk drives, CD-ROM drives, tape drives and the like. In general, inasmuch as the CPU, devices on the system board and the display must be fully powered up when the user is actively using the system, power management of these devices is relatively straight forward as compared with external devices which may or may not be in use as a function of user activity. The present invention provides a mechanism for managing the power of these external devices. Such management may be at the device driver level or by some centralized decision making software. There are pro's and con's to each approach. Device drivers are in the best position to know if their associated device is active or ready to change state. However, there may be some dependencies of that device on another device. There might be a sequence of events that must transpire before the device can change its power state. There could also be issues with several devices simultaneously changing power state which could result in voltage spikes or sags. A centralized decision making component would address these issues, but such centralized component has no knowledge of the activity of any particular device. The present invention uses an enhanced device driver, i.e., a device driver with a PM handler, to manage the power of its connected device, and, optionally, the PM Coordinator 21 is used to acknowledge and approve a device driver's request for a power change.

The PM handler 17 is an interface used to pass information to the device driver from the event manager and to/from each device driver 15 and the PM Coordinator 21 if present. This information can be broken into two classes as follows: (1) Event Notifications, and (2) Device Control Command Interface:

(1) Event Notifications:

Power management according to the invention requires that device drivers be notified about events that may affect its coupled device's power state. It is the responsibility of the device driver to decide if these events should actually cause it to change the device's power consumption level. Examples of power events that might be of interest to a device driver are:

a) User_Idle and User_Active: The User_Idle and User_Active power events are passed to the PM handler 17 of a device driver 15 which performs the processing shown in FIG. 3 to determine whether or not to power-up the device, or enter the low power state.

b) Sleep: The Sleep power event is used to initiate a global power down. The source of this might be a power button being pushed. Power management aware drivers use this event to transition their devices to a low-power state as soon as possible.

c) Wakeup: The Wakeup power event is used to initiate a global power up. The source of this event might be a power button being pushed. Power management-aware device drivers should use this to transition their devices to full-power state as soon as possible.

It should be noted that the OS_Idle power event is not used for power management of external devices as explained below.

(2) Device Control Command Interface:

Each device driver has an interface for controlling power state changes, getting the device driver's power management capabilities, and for configuring the coupled device's capabilities. Once the device driver has determined from a power event that it should change power state, it issues a request to change its device's power state which is sent to the PM Coordinator, if available. The PM Coordinator calls the device driver through the control command interface/PM handler and grants permission to change the device's power state. In embodiments where there is no PM Coordinator, the device driver, through the PM handler, initiates the change to its coupled device's power state immediately. Functions included in the device control command interface or PM handler are as follows:

Power Events Broadcast By Event Manager

Process Event(): The PM handler associated with each device must have a mechanism for receiving power events from the event manager, i.e., event type (i.e., User_Idle, User_Active, Sleep, Wakeup or OS_Idle).

PM Coordinator Calls To PM Handler

To process requests from a PM Coordinator, the PM handler must also have the following functionality.

GetDeviceCapabilities(): This function is used to determine the capabilities of the device/device driver. This includes information about the device's auto power management capabilities, power states supported, power consumption in the different states and latency of these states.

SetDeviceCapabilities(): This is used to enable/disable any auto power management, set any timeout parameters, and set the lowest power state that the device should transition to.

GetPowerState(): This function is used to determine what state the device is currently in.

SetPowerState(): This function is used to explicitly set the power state of the device, as well as allow the device to change state per its own request.

Driver Call To PM Coordinator

To request permission to initiate a change state from a PM Coordinator, the PM handler must initiate the following call.

RequestPowerChange(): Once a device driver 15 has determined that its coupled devices power state may be changed as a result of a power event having been sent to its PM handler 17, if a PM Coordinator is in use, the device driver initiates a RequestPowerChange() to the PM Coordinator.

To take fall advantage of the power management functionality provided by a PM Coordinator, device drivers must perform the following functions:

1) Receive Power Events: All device drivers 15 must register its PM handler 17 callback with the event manager 13 to receive power event messages from the event manager through the Process Event() mechanism.

2) Track System Power State: Each device driver must be kept informed of the desired system power state by transmission of power events by the event manager so that it can transparently power its coupled device on and off as needed to complete system accesses and then return to the desired power level of the system.

3) Determine Device State change requirements: Once a power event has been received, the device driver must determine if a device power state change is required. If a state change is required (other than transparent transition—i.e., those having little or no transient impact to the system power supply), if a PM Coordinator is installed, the device driver must request a power state change from the PM Coordinator it registered with at initialization time. This request should only happen once the device driver has determined that the device is not in use, or that the state change will be transparent to its current usage level.

4) Implement Power State Changes: Once permission has been granted by the PM Coordinator, if installed, the device driver implements the appropriate state change as configured by the user (see configurability discussion below). In the absence of an installed PM Coordinator, the device driver immediately implements the appropriate state change as configured by the user.

5) Auto State Change by Access: If an access to the device is required that would effect the current power state of the device (e.g., an access to a powered-down device), the device driver must request a power state change (similar to steps 3 and 4), effect the state change grant in the coupled device, complete the access and then return to its coupled device's quiescent state until an external event is received which alters the power state for the system.

Each device driver, through its PM handler, provides configurability of its coupled device's power state. This is the state that the device goes to when a Sleep or User_Idle event has been received. There can be a different power state configuration for the User_Idle event than the Sleep event if the user has determined that the latencies for the Sleep event are too large. This difference may be configured by the user based on the power-up latencies which have been determined to be acceptable. There are two options for setting the low power state.

a) Set Device Low Power State: The user can select among the externally visible power states that are set forth below, i.e., ON, PM ENABLED, STANDBY, SUSPEND, OFF.

b) Set Power Up Latency: If the user has determined that a maximum power-up latency is needed based on some time value, the device driver can determine its lowest acceptable power state that still meets the requirements of the user.

Figure 4A:
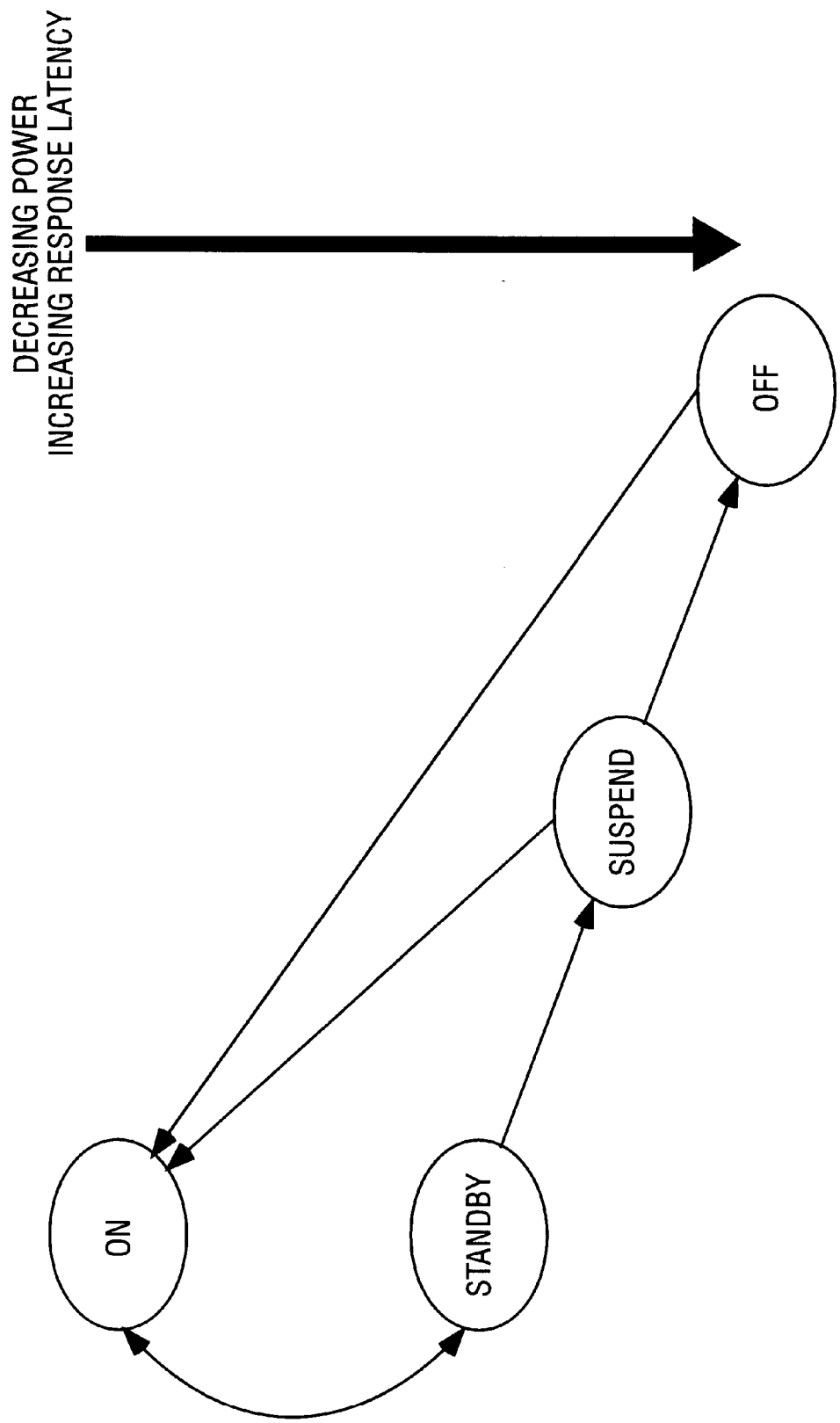
FIG. 4a is a device state model representing distinct device states and transitions needed by an add-in device/device driver combination to effectively manage power levels.

Most devices support a subset of the above-defined device power states (i.e., SUSPEND, ON, STANDBY and OFF). FIG. 4a shows the relationship between these power states as power decreases and response latency increase. Some devices also support the PM Enabled power state.

Figure 4B:
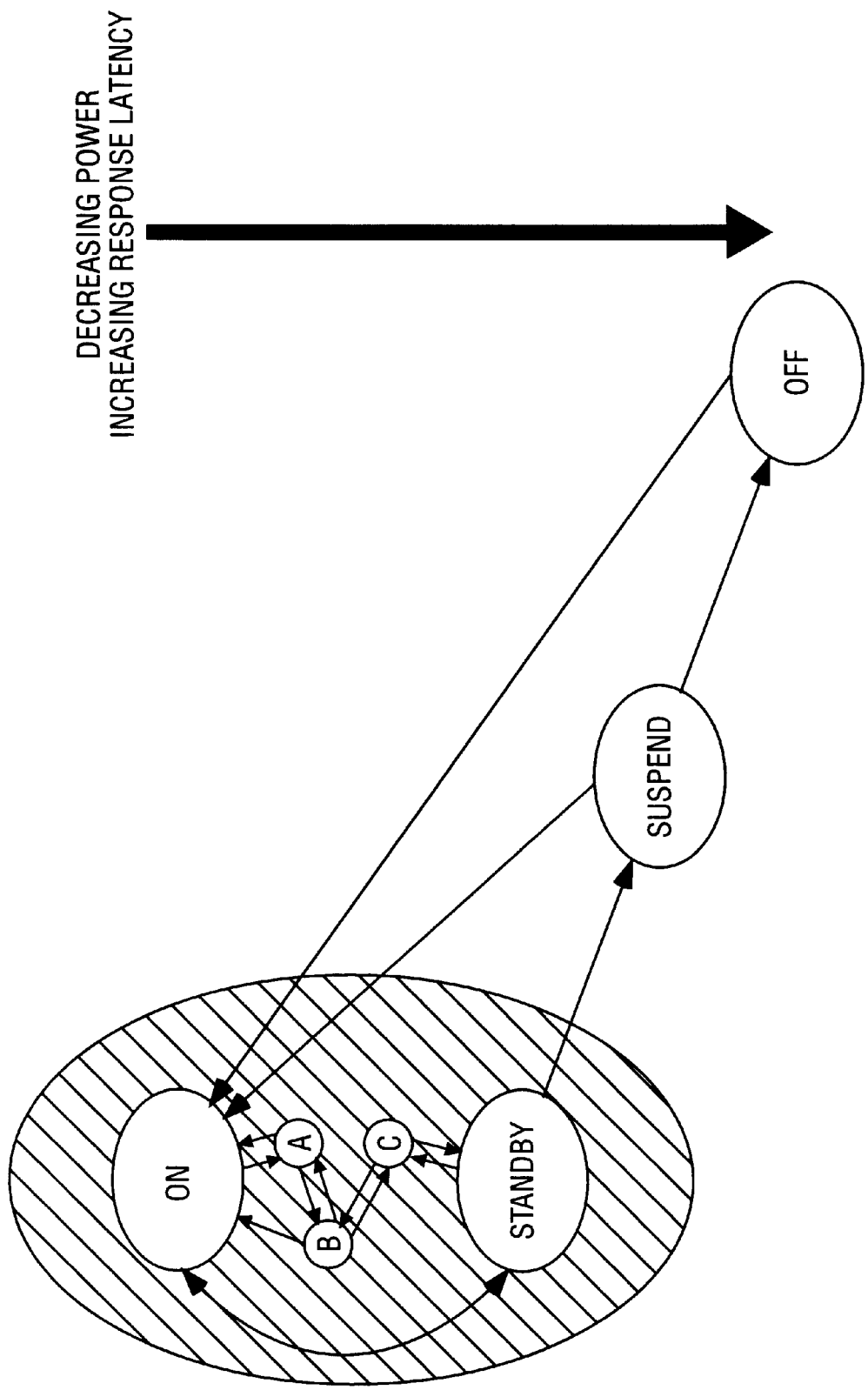
FIG. 4b is a device state model representing distinct device states and transitions needed by an add-in device/device driver combination to effectively manage power levels for a device having self-management capability.

| | |
|---|---|
| ON: | On is the fully functional state that requires no software support. This is the normal operating state of the device. |
| PM ENABLED: | When a device has auto power management capabilities and these abilities are enabled, it is in the PM Enable state. In this state, the device and/or device driver can change power levels without any external control. Power transitions within this state are transparent to external software and requires no external events. |
| STANDBY: | Standby for Auto PM Enabled devices is the lowest power state that the device can auto transition to. An auto PM device is one that is self-managed and can transition between various power levels as shown in FIG. 4b. Devices (both auto and non-auto PM devices) can also enter this state by receiving an external event such as User_Idle or Sleep. |
| SUSPEND: | In this state, any internal device specific data has been preserved and power can be received from the device. The device can assume that the operating system is not running in a normal fashion and that the devcie will not be accessed. |
| OFF: | In this state the device is non-functional. |

FIG. 3 is a flowchart showing the processing performed by a device driver modified by including a PM handler to take advantage of the power management techniques of the present invention for User_Idle/User_Active power events. The box labeled Process Access Request represents the functionality of the device driver, with the remaining portions of FIG. 3 represent the added functionality of the PM handler for processing a User_Idle power event. A flowchart for Sleep/Wakeup power events would be similar except that, as noted above, for User_Idle and User_Active, an idle/sleep timer is set to a user configurable amount of time, while for the Sleep and Wakeup power events no timer is used. Instead, the Wakeup power event causes the device to wake up immediately, and the Sleep power event causes the device to be put into a lower power state when the device is no longer in use and there are no pending device access requests. (The OS_Idle power event is not applicable for power management of external devices because the OS_Idle power event occurs too frequently for external devices to be able to keep up with it in a manner which would be useful for power management.) The details for modifying an existing device driver to include the above-described functions should be readily apparent to persons skilled in the field of the invention from this description and FIG. 3.

We claim:

1. In a computer having a processor, on-board system devices, a display and other external devices, a system for managing and coordinating the power consumption of the display and the external devices comprising:

a) a display and an associated display device driver;

b) a plurality of external devices and buses, each having an associated external device driver;

c) event manager means for generating power events indicating that power being supplied to the display and external devices and buses may be changed without specifying any particular device or bus; and d) a plurality of power management handler means, each associated with a respective one of said display device driver and said external device drivers, each of said plurality of power management handler means for receiving power events generated by said event manager and for making a decision of whether or not to activate a change in power requirements for its associated device based on a received power event and under predetermined conditions, said power events having been broadcast to all external device drivers and to said display device driver.

2. The system defined by claim 1 wherein each of said power management handler means comprises:

a) means for determining the capabilities of its associated device including information about the device's auto power management capabilities, power states supported, power consumption in different power states and latency of the power states;

b) means for enabling/disabling any auto power management, setting any time-out parameters, and setting the lowest power state that the device should transition to;

c) means for determining the power state the associated device is currently in;

d) means for setting the power state of the associated device.

3. The system defined by claim 1 wherein said event manager means comprises means for receiving system events generated by operation of said personal computer and processing said received system events as power events which are transmitted to said display driver and external device drivers.

4. The system defined by claim 1 wherein said display device driver causes said display to change state between a low power mode and normal operating mode by asserting and deasserting a SYNC signal used by said display under predetermined conditions.

5. The system defined by claim 1 wherein each of said power management handler means further comprises a mechanism for receiving power events generated by said event manager means and processing received power events to cause its associated device to change power state.

6. The system defined by claim 5 wherein said power states are at least one of ON, PM ENABLED, STANDBY, SUSPEND and OFF.

7. A system as in claim 1 wherein said event manager means comprises the processor configured to execute software to generate power events, and each of said plurality of power management handler means comprises the processor executing software to receive the power events.

8. A system as in claim 2 wherein said means for determining the capabilities of its associated device comprises the processor executing software.

9. A system as in claim 2 wherein said means for enabling/disabling comprises the processor executing software.

10. A system as in claim 2 wherein said means for determining the power state comprises the processor executing software.

11. A system as in claim 2 wherein said means for setting the power state comprises the processor executing software.

12. A system as in claim 3 wherein said means for receiving system events comprises an interface to said display device driver.

13. A computer system comprising:

a plurality of devices and device drivers, each device being associated with at least one of the device drivers;

event manager generating at least one power event to be broadcast to the device drivers, the power event indicating that power being supplied to the devices may be changed without specifying any particular device; and a plurality of power management handlers, each associated with a respective one of the device drivers, each handler receiving the power event and on the basis of that and predetermined conditions making a decision of whether or not to activate a change in power requirements for the associated device.

14. The computer system of claim 13 wherein each handler further determines the capabilities of the associated device including information about the device's auto power management capabilities, power states supported, and power consumption in different power states.

15. The computer system of claim 14 wherein each handler further enables/disables auto power management, sets time out parameters, sets lowest power state to which the associated device should transition, determines the current power state of the associated device, and sets the power state of the associated device.

16. The computer system of claim 13 wherein the event manager receives system events generated by operation of the computer system, and processes the system events as power events which are transmitted to the device drivers.

17. The computer system of claim 13 wherein the plurality of devices includes at least one bus.

18. In a computer system, a method comprising:

generating at least one power event and broadcasting it to a plurality of device drivers of the computer system, the power event indicating that power being supplied to devices may be changed without specifying any particular device; and making a decision by a power management handler of whether or not to activate a change in power requirements for a device associated with one of the plurality of device drivers in response to receiving the power event.

19. A method as in claim 18 further comprising the handler determining the capabilities of the device including information about the device's auto power management capabilities, power states supported, and power consumption in different power states.

20. A method as in claim 19 further comprising:

the power management handler enabling/disabling auto power management;

setting the lowest power state to which the device should transition;

determining the current power state of the device; and setting the power state of the device.

21. A method as in claim 18 further comprising:

receiving system events generated by operation of the computer system; and processing the system events as power events which are transmitted to the device drivers.

* * * * *